United States Patent
Girlando et al.

(10) Patent No.: US 10,027,101 B2
(45) Date of Patent: Jul. 17, 2018

(54) SUPPORTING STRUCTURE FOR CONTACTS OF HIGH-VOLTAGE DISCONNECTORS

(71) Applicant: General Electric Technology GmbH, Baden (CH)

(72) Inventors: Vincenzo Girlando, Noventa di Piave (IT); Marco Nosilati, Noventa di Piave (IT)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/480,274

(22) Filed: Apr. 5, 2017

(65) Prior Publication Data
US 2017/0288382 A1   Oct. 5, 2017

(30) Foreign Application Priority Data
Apr. 5, 2016 (IT) .......................... 102016000034522

(51) Int. Cl.
| | |
|---|---|
| *H02G 7/20* | (2006.01) |
| *H02G 7/00* | (2006.01) |
| *H01H 31/02* | (2006.01) |
| *H01B 17/14* | (2006.01) |
| *H01B 17/32* | (2006.01) |
| *H01H 31/28* | (2006.01) |
| *H02B 5/00* | (2006.01) |

(52) U.S. Cl.
CPC ............ *H02G 7/00* (2013.01); *H01H 31/023* (2013.01); *H01B 17/14* (2013.01); *H01B 17/32* (2013.01); *H01H 31/28* (2013.01); *H02B 5/00* (2013.01)

(58) Field of Classification Search
CPC .. H02G 7/00; H02G 7/02; H02G 7/04; H02G 7/05; H02G 5/00; H02G 7/20; H01H 31/023; H01H 31/28; H01H 31/00; H01H 31/003; H01B 17/14; H01B 17/32; H01B 17/16; H01B 17/18; H01B 17/325; H02B 5/00
USPC ............. 174/45 R, 40 R, 137 R, 138 R, 135, 174/138 G, 140 R, 140 CR
See application file for complete search history.

(56) References Cited

U.S. PATENT DOCUMENTS

| | | | | |
|---|---|---|---|---|
| 3,745,274 | A * | 7/1973 | Cole ...................... | H01H 31/30 174/150 |
| 3,869,650 | A * | 3/1975 | Cunningham ............ | H01T 1/14 361/117 |
| 6,678,151 | B2 * | 1/2004 | Costante .................. | H02B 5/00 361/602 |
| 7,804,033 | B2 * | 9/2010 | Dianin .................... | H01H 31/28 200/48 CB |
| 8,711,538 | B2 * | 4/2014 | Woodworth ............. | H01T 4/14 361/10 |
| 8,895,861 | B2 * | 11/2014 | Cotton ................... | H02G 7/053 174/45 R |

(Continued)

*Primary Examiner* — Angel R Estrada
(74) *Attorney, Agent, or Firm* — GE Global Patent Operation; Scott R. Stanley

(57) ABSTRACT

This invention relates to a supporting structure for contacts of high-voltage disconnectors, characterized in that it comprises at least one vertical central composite insulator that is stayed by means of at least two inclined insulators, each of which is coupled at a first end to said at least one central composite insulator and at the second opposite end to a base body for said at least one vertical central composite insulator.

8 Claims, 3 Drawing Sheets

(56) References Cited

U.S. PATENT DOCUMENTS 9,768,594 B2 * 9/2017 Errico ...................... H02B 5/00

* cited by examiner

SUPPORTING STRUCTURE FOR CONTACTS OF HIGH-VOLTAGE DISCONNECTORS

BACKGROUND TO THE INVENTION

This invention relates to a supporting structure for contacts of high-voltage disconnectors.

Nowadays, it is becoming increasingly common to perform electric power transmission by means of high-voltage direct-current (HVDC) power distribution systems.

Electrical power transmission with such systems is often preferable because it can be less expensive and suffer less load loss on particularly long transmission routes compared to alternating-current systems.

High-voltage direct-current transmission systems typically include a line cable and a receiving station; between the station and the line, one or more disconnectors can be interposed.

BRIEF DESCRIPTION OF THE INVENTION

In general, the disconnectors comprise a pair of contacts for opening and closing the disconnector, each of which is supported by a corresponding support.

The supports of the known type comprise two or more mutually parallel vertical insulators, made of porcelain or cylindrical in a polymer material and filled with polyurethane or another similar insulator.

Among the most common and efficient are the so-called 'tripod' supports, consisting of three columnar elements, each of which is subdivided into segments to allow mounting at different heights of the shielding rings of the electrical field.

The head of such supports includes a mounting plate or rack for contact of a disconnector.

Although they are widespread and appreciated, such known supporting structures have two important limitations.

A first limitation is that each of these supporting structures is composed of a large number of components, with correspondingly high direct production costs and proportionately high assembly times and costs.

A second limitation is the overall dimensions of such supporting structures.

In fact, the tripod supports each define a diametrical overall dimension greater than 3 meters, with equally bulky anti-corona rings.

Because of similar overall dimensions, the application of such supports to a disconnector, for example of the knee type, requires a gap between the supports in the vicinity of the two contacts of six meters, with consequent limitations on the current values that can be managed by such a disconnector.

In embodiments of the invention an objective is to develop a supporting structure for high-voltage contacts of disconnectors able to overcome the above limitations of the prior art.

Within the scope of this task, an important aspect of an embodiment of the invention is to develop a supporting structure that is simpler and more economical to implement.

Another object of an embodiment of the invention is to develop a supporting structure that is simpler and quicker to assemble.

Another object of an embodiment of the invention is to develop a supporting structure that has reduced dimensions in the vicinity of the supported contact.

This task and these and other objects, which will become apparent hereinafter, are achieved by a supporting structure for contacts of high-voltage disconnectors according to claim 1.

BRIEF DESCRIPTION OF THE DRAWINGS

Further characteristics and advantages of embodiments of the invention will become apparent from the description of, not exclusive, embodiments of a supporting structure according to the invention, illustrated only by way of indicative and non-limitative examples in the accompanying drawings, where.

Figure 1:
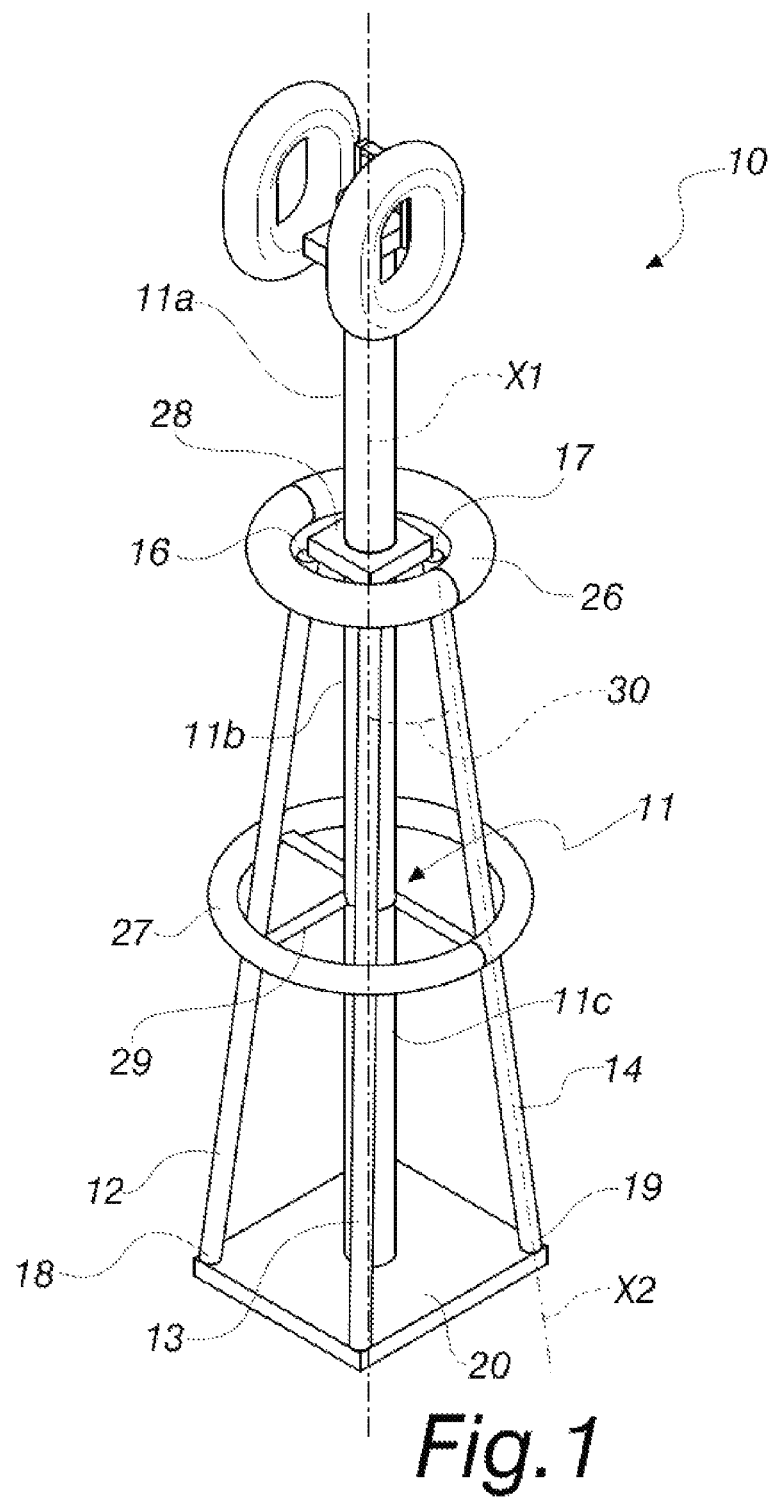
FIG. 1 shows a perspective view of a supporting structure according to an embodiment of the invention.

With reference to the above figures, a supporting structure for contacts of high-voltage disconnectors according to the invention is shown, in its entirety in a first embodiment, with the number 10.

DETAILED DESCRIPTION OF THE INVENTION

Such a supporting structure 10 is exemplified here for applications with high-voltage direct-current disconnectors, so-called 'HVDC'.

Such a supporting structure 10 is characterized in that it comprises a composite vertical central insulator 11, which is stayed by means of four inclined insulators 12, 13, 14, a fourth insulator not in view and understood to be symmetrical to the inclined insulator 13 with respect to the principal axis X1 of the central insulator 11, each of which is coupled at a first end, for example the first ends 16 and 17 of the inclined insulators 12 and 14, to said composite central insulator 11, and at the second opposite end 18 and 19 to a base body 20 for said least one composite vertical central insulator 11, for example a metal plate.

The inclination of the staying insulators 12, 13 and 14 is understood to be such that the first ends 16 and 17 of the staying insulators are closer to the principal axis X1 of the central composite insulator 11 with respect to the second ends 18 and 19.

In this first embodiment, therefore, the supporting structure 10 comprises four symmetrical inclined staying insulators.

Alternatively, it is also possible to use only two inclined staying insulators, arranged symmetrically, or three inclined insulators, depending on the needs and technical requirements.

Figure 2:
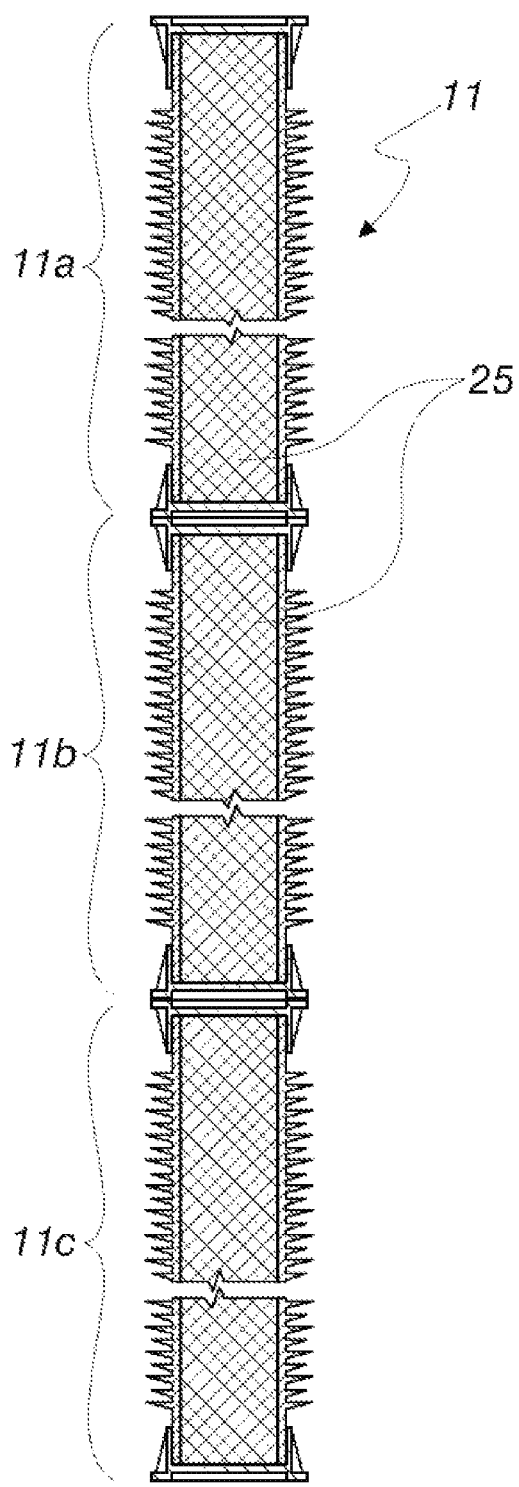
FIG. 2 shows a sectional side view of a vertical central insulator of a supporting structure according to an embodiment of the invention.

In an embodiment of the supporting structure 10 according to an embodiment the invention, it comprises only one composite central insulator 11, composed of multiple sections 11a, 11b and 11c in FIG. 2.

This composite central insulator 11 is understood to be of the type with tubular segments with cavities 25 filled with polyurethane.

The supporting structure 10 according to an embodiment of the invention comprises at least one anti-corona ring, and in the example described here, two anti-corona rings 26 and 27, for shielding the electrical field, arranged with an axis of symmetry parallel to the principal axis X1 of the central composite insulator 11.

In this embodiment, between a first segment of the central insulator 11a and a second segment of the central insulator 11b, a plate 28 or other similar frame is interposed, in order to connect the first ends 16 and 17 of the staying insulators 12, 13 and 14.

This plate 28 also serves as a support for a first upper anti-corona ring 26.

Between a second segment of the central insulator 11b and a third segment of the central insulator 11c, a frame 29 is interposed to support a second anti-corona ring 27.

The inclined staying insulators 12, 13 and 14 are composed of suspended composite insulators of the type used, for example, for high-voltage direct-current overhead lines.

These inclined staying insulators 12, 13 and 14 act substantially as stay rods that serve to maintain the composite vertical central insulator 11 in its correct vertical position.

Figure 3:
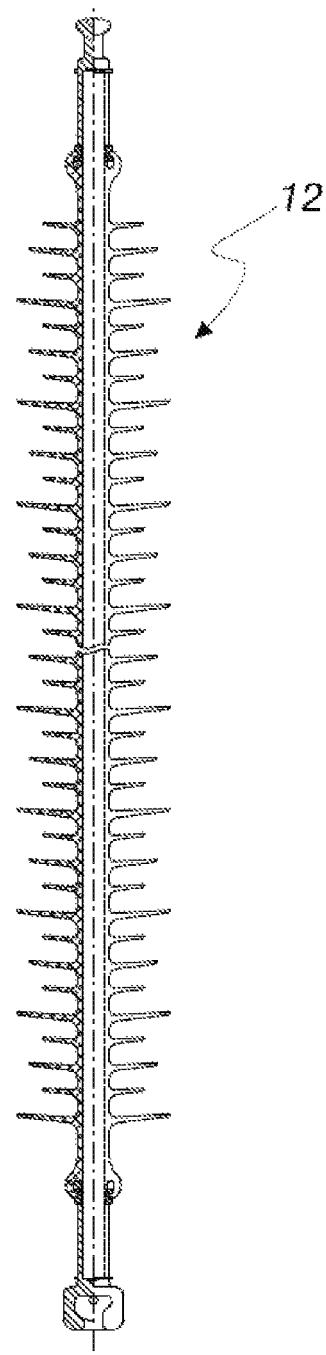
FIG. 3 shows a sectional side view of a staying insulator of a supporting structure according to an embodiment of the invention.

An example of such a staying insulator 12 is shown in FIG. 3.

The inclined staying insulators 12, 13 and 14 are positioned with the principal axis of symmetry X2 inclined at an angle, indicated by 30 in FIG. 1, that is between 5° and 40° relative to the principal axis of symmetry X1 of a reference composite vertical central insulator.

In an embodiment this angle is 10°.

The supporting structure 10 according to an embodiment of the invention, the overall dimensions of said supporting structure 10 decrease from the bottom to the top, thus allowing the contacts of a disconnector, each of which is supported by a similar supporting structure 10, to be further spaced from each other with equal structural stability of the supports.

Figure 4:
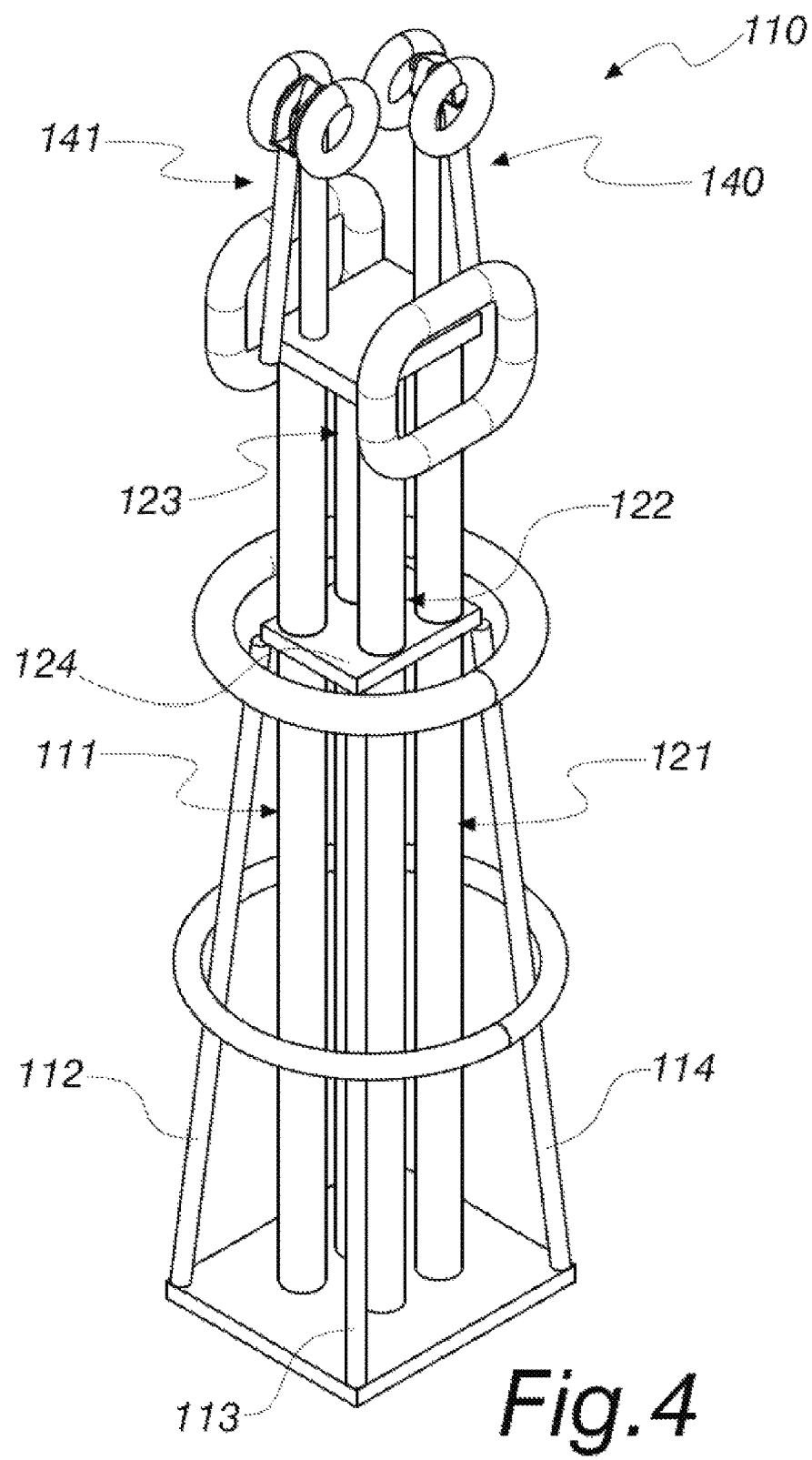
FIG. 4 shows a perspective view of a supporting structure according to an embodiment of the invention.

In an embodiment of a supporting structure according to an embodiment of the invention 110, there may be two vertical composite insulators 111, 121, or, as in FIG. 4, there may be four vertical composite insulators 111, 121, 122 and 123.

In the example of FIG. 4, the four central insulators 111, 121, 122 and 123 support, two by two, a corresponding movable contact 140 and 141 of a knee disconnector.

The vertical composite insulators have a common intermediate frame 124 that links said inclined insulators 112, 113, 114 and 115.

It is found, in practice, that an embodiment of the invention achieves the intended task and purposes.

In particular, a supporting structure is developed that is simpler and more economical to construct, being formed from a much smaller number of components compared to supports of the 'tripod' type, and thus also simpler and quicker to assemble.

In addition, a supporting structure is developed that has reduced dimensions in the vicinity of the supported contact, so as to allow a wider variety of applications in the case of setup spaces that are relatively small, thus maintaining a situation of safety of use that is not inferior to supports of the known type.

The invention thus conceived is open to numerous modifications and variants; moreover, all the details may be replaced with other technically equivalent elements.

In practice, the components and materials employed, provided that they are compatible with the specific use, and the dimensions and the incidental shapes, may be any that are in accordance with the requirements and the state of the art.

Where the characteristics and techniques mentioned in any claim are followed by reference signs, such signs have been included for the sole purpose of increasing the comprehensibility of the claims and, consequently, such reference signs do not have any limitative effect on the interpretation of each element identified by way of example by such reference signs.

What we claim is:

1. A supporting structure for contacts of high-voltage disconnectors, comprising:
    at least one vertical central composite insulator comprising a first segment, a second segment, and a plate interposed between the first segment and the second segment; and
    at least two inclined insulators, each of the at least two inclined insulators having a first end coupled to the plate and having a second end coupled to a base body.

2. The support according to claim 1, wherein said at least one central composite insulator comprises at least two vertical composite insulators.

3. The support according to claim 2, wherein said at least two vertical composite insulators comprise four vertical composite insulators.

4. The support according to claim 1, wherein said at least two vertical central composite insulators have a common intermediate frame for the fixing of said at least two inclined insulators.

5. The support according to claim 1, wherein said at least two inclined insulators are arranged so that the main axis of symmetry is inclined by an angle between 5° and 40° with respect to the main axis of symmetry of a reference vertical central composite insulator.

6. The support according to claim 1, wherein said angle is 10°.

7. The support according to claim 1, comprising four symmetrical inclined staying insulators.

8. The support according to claim 1, wherein at least two inclined staying insulators are constituted by suspended composite insulators for direct-current high-voltage overhead lines.

* * * * *